United States Patent [19]
Bauer

[11] Patent Number: 5,589,058
[45] Date of Patent: Dec. 31, 1996

[54] APPARATUS FOR TREATMENT OF WATER

[75] Inventor: Matthew J. Bauer, Niles, Mich.

[73] Assignee: M. J. Bauer Company, Inc., Granger, Ind.

[21] Appl. No.: 331,050

[22] Filed: Oct. 28, 1994

[51] Int. Cl.$^6$ ........................................................ C02F 1/42
[52] U.S. Cl. ........................... 210/98; 210/105; 210/140; 210/143; 210/191
[58] Field of Search ................................ 210/97, 98, 102, 210/103, 105, 106, 108, 140, 143, 190, 191, 278

[56] References Cited

U.S. PATENT DOCUMENTS

| | | | |
|---|---|---|---|
| 3,531,402 | 9/1970 | Thompson | 210/190 |
| 4,104,165 | 8/1978 | Braswell | 210/191 |
| 4,184,893 | 1/1980 | Halvorson et al. | 521/26 |
| 4,202,737 | 5/1980 | Shimizu | 521/26 |
| 4,379,057 | 4/1983 | Meiser et al. | 210/662 |
| 4,385,992 | 5/1983 | Clauer et al. | 210/662 |
| 5,073,255 | 12/1991 | Chili et al. | 210/143 |
| 5,108,616 | 4/1992 | Kunz | 210/678 |

FOREIGN PATENT DOCUMENTS

| | | |
|---|---|---|
| 1352176 | 5/1964 | France. |
| 3528800 | 2/1987 | Germany. |
| 61-12490 | 1/1986 | Japan. |

OTHER PUBLICATIONS

Three Steps to Softener Efficiency *Water Technology*, Apr. 1993.
Go With the Grains, *Water Technology*, Apr. 1993.
Braswell Valve Flow Diagram, Braswell Water Quality Systems, Inc.

*Primary Examiner*—Ivars Cintins
*Attorney, Agent, or Firm*—Taylor & Associates, P.C.

[57] ABSTRACT

The invention is directed to a water treatment system including a treatment tank having an ion-exchange mineral bed or filter bed therein, and a valve head assembly disposed on top of and in fluid communication with the treatment tank. The valve head assembly includes a passage for allowing a flow of fluid through the valve head assembly, a vacuum pressure creating device disposed within the passage, a drain disposed within the passage and at a downstream side of the vacuum pressure creating device, and a valve disposed within the passage and at a downstream side of the vacuum pressure creating device. The valve is movable to an open position and a closed position for allowing fluid flow through the vacuum pressure creating device, whereby a portion of fluid flows through the drain and a lesser remaining portion of fluid flows through the valve when the valve is in the open position.

13 Claims, 9 Drawing Sheets

Microfiche Appendix Included
(44 Microfiche, 1 Pages)

APPARATUS FOR TREATMENT OF WATER

BACKGROUND OF THE INVENTION

1. Field of the Invention

The present invention relates to ion-exchange and filter water systems, and, more particularly, to an ion-exchange resin bed system.

2. Description of the Related Art

Ion-exchange water treatment systems may be of two general types, i.e., a timed system and a demand system. A timed system utilizes a timer to regenerate a resin bed within a treatment tank of the water treatment system after a particular period of time has elapsed. With a timed system, it is necessary to estimate, based upon the users application demand, water usage history, etc., when the treatment tank should be regenerated. If actual water usage exceeds the capacity of the unit during the time period, "untreated" water (i.e., water containing impurities such as iron, calcium and magnesium) could be output by the water treatment system. Accordingly, timed water treatment systems are typically regenerated well ahead of the point when the total amount of normal water use would occur to prevent the occurrence of such "untreated" water. Such systems have the disadvantage of discharging excess water and regenerant, e.g., salt, into a sewer system, with associated detrimental environmental impact.

A demand system of conventional design utilizes a flow meter (or turbine) at the output valve of the treatment tank to count the actual amount of water used since the last regeneration. The flow meter outputs signals to an electronic counter which initiates regeneration when the pre-set count (corresponding to a total amount of flow through the treatment tank outlet) equals a preset amount corresponding to an exchange capacity of the resin bed within the treatment tank. However, such systems are limited by the sensitivity of the flow meter. Such meters are not typically able to count all the flow therethrough in a small amount per unit of time, such as caused by drips from sinks, appliances, etc. Also, such meters are unable to register if an overlap or overdrive occurred at extremely high flow rates. Such small amounts of water which actually pass through the flow meter (or turbine) but which are not detected thereby actually amount to several gallons per hour, or even more. Because conventional systems do not allow for such lost water, the system may experience oversaturation or overrun of capacity after a certain volume of water. That is, the system continues to operate after the resin bed is unable to perform additional ion exchange, resulting in untreated water being output from the water treatment system.

U.S. Pat. No. 4,104,165 (Braswell), assigned to the assignee of the present invention, discloses a water softening system which may be regenerated on a timed basis. Braswell discloses a valve head assembly mounted to a treatment tank and having a poppet type plunger valve disposed therein. The plunger valve includes a venturi section which creates a vacuum within the valve head assembly and treatment tank to draw saturated brine solution through the treatment tank and into the valve head. A solenoid valve is disposed downstream of the plunger valve and is actuated to allow fluid flow through the plunger valve. All fluid which flows through the plunger valve also flows through the solenoid valve. A problem with such solenoid valves is that they typically have a relatively low flow rate, e.g., 5 gallons/ minute maximum, which accordingly limits the regeneration time of the water treatment tank. Moreover, since all of the fluid flows through the solenoid valve when the solenoid valve is in an open position, debris and foreign matter within the fluid may lodge within the solenoid valve and cause improper functioning thereof.

It is also known in the art to use counter current and pulsating flow through a treatment tank to reduce the amount of time required to regenerate the resin bed and to more fully recharge the resin bed and to prevent channeling or fluidizing of the resin bed. For example, U.S. Pat. No. 5,108,616 (Kunz) discloses an ion exchange water treatment system using a pulsed, counter current flow of regenerant through the treatment tank. The duration of the pulsations and the time period between pulsations is such that the ion exchange granules making up the resin bed within the treatment tank are not substantially mixed during the regenerating process.

An advantage of solenoid valves is that they may be quickly opened and closed to thereby decrease the amount of time required to regenerate a particular treatment tank.

What is needed in the art is a water treatment system which induces a flow of regenerant through the treatment tank and into the valve head assembly very quickly, using less water and time in comparison with conventional units.

A further need is a system which utilizes diaphragm valves to quickly direct water in a particular direction within the valve head, while eliminating problems of debris buildup within and low flow rate through such a diaphragm valve.

An additional need is a water treatment system which allows various time periods for certain segments of the regeneration process to be quickly and easily altered depending upon water conditions, water usage, high or low pressure, etc.

A still further need is a water treatment system which allows for lost or unaccounted for water that has gone through the system and thereby eliminates overlap conditions associated therewith and rebuilds the bed if an overlap condition occurs.

An additional need is a water treatment system which monitors exact water usage of one or more tanks within a water treatment system and regenerates each particular tank according to the exact amount of water used by that tank.

A further additional need is a water treatment system which utilizes a vacuum pressure within the valve head to create a relatively strong suction pressure within the treatment tank and thereby removes substantially all the gases therein, i.e., degassifies the interior of the treatment tank and draws the regenerate in an undiluted state.

SUMMARY OF THE INVENTION

The present invention provides a valve head assembly which uses a fast acting valve to effect a flow of fluid through the valve head assembly, while at the same time having only a small portion of fluid flowing through the solenoid valve, relative to the total amount of fluid flowing through the valve head assembly.

The invention comprises, in one form thereof, a water treatment system including a treatment tank having an ion-exchange mineral or filtration bed therein, and a valve head assembly disposed on top of and in fluid communication with the treatment tank. The valve head assembly includes a passage for allowing a flow of fluid through the valve head assembly, a vacuum pressure creating device disposed within the passage, a drain disposed within the passage and at a downstream side of the vacuum pressure creating device, and a valve disposed within the passage and at a downstream side of the vacuum pressure creating device. The valve is movable to an open position and a closed position for allowing fluid flow through the vacuum pressure creating device, whereby a portion of fluid flows through the drain and a lesser remaining portion of fluid flows through the valve when the valve is in the open position.

An advantage of the present invention is that the valve head assembly induces a flow of brine through the treatment tank and into the valve head assembly very quickly, causing faster exchange with 100% regenerant in comparison with conventional units, thus saving water in the process.

A further advantage is that fast acting valves are used to quickly direct water in a particular direction within the valve head, while eliminating problems of debris buildup within and low flow rate through the valve.

An additional advantage is that various time periods corresponding to certain segments of the regeneration process can be quickly and easily altered depending upon water conditions, water usage, hardness etc.

A still further advantage is that lost water is allowed for, thereby eliminating overcapacity conditions associated therewith.

An additional advantage is that exact water usage of one or more tanks is monitored and each particular tank can be regenerated according to the exact amount of water used by that tank.

A further advantage is that a vacuum pressure within the valve head is used to create a relatively strong suction pressure within the treatment tank and thereby remove substantially all the gases therein, i.e., degassify the interior of the treatment tank.

BRIEF DESCRIPTION OF THE DRAWINGS

The above-mentioned and other features and advantages of this invention, and the manner of attaining them, will become more apparent and the invention will be better understood by reference to the following description of an embodiments of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
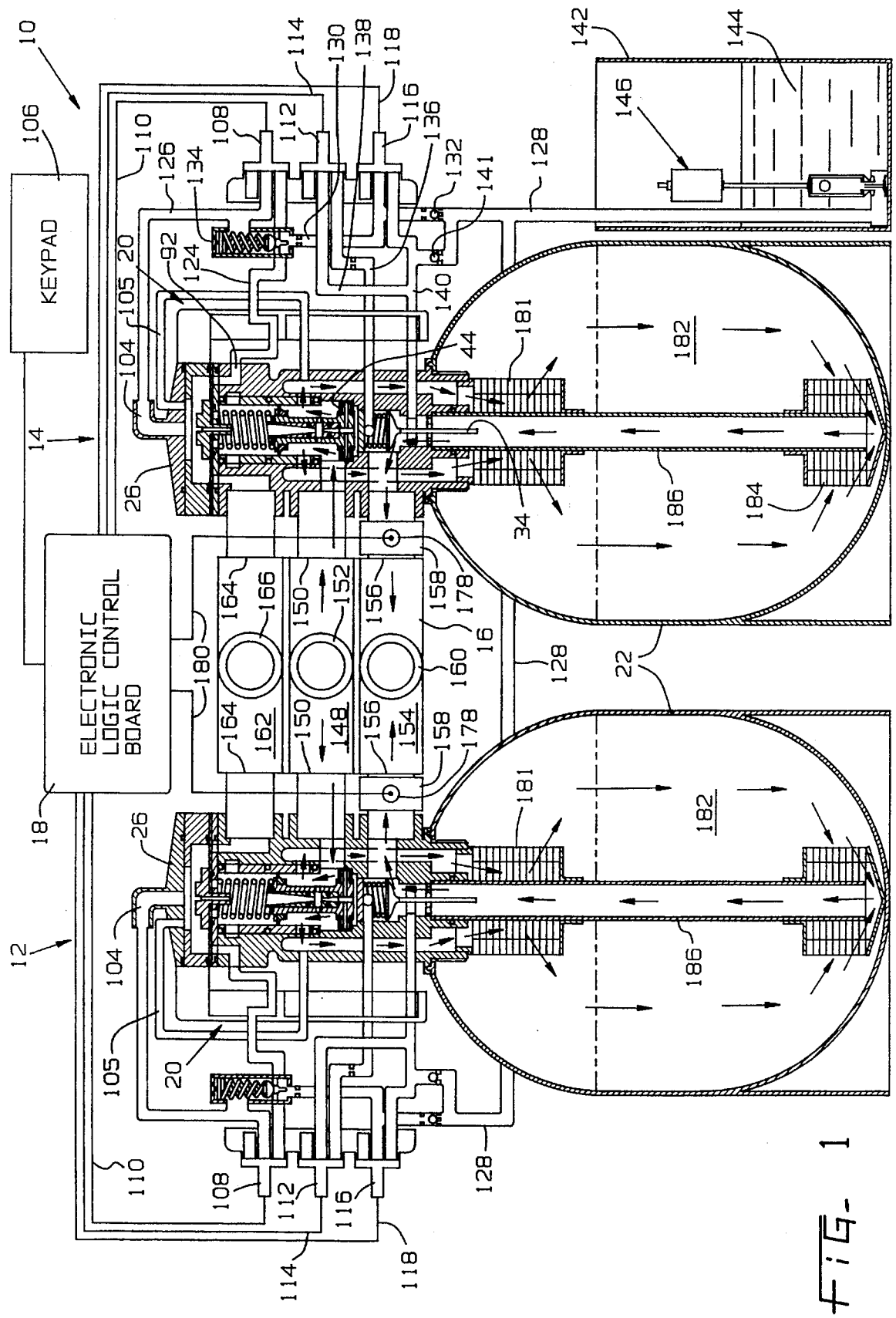
FIG. 1 is a schematic illustration of an embodiment of the present invention, showing fluid flow during an in-service mode.

Referring now to the drawings and more particularly to FIGS. 1–5, there is shown a water treatment system 10 of the present invention, including treatment tank assemblies 12, 14, manifold 16 and processor or electronic logic control board 18.

Figure 9:
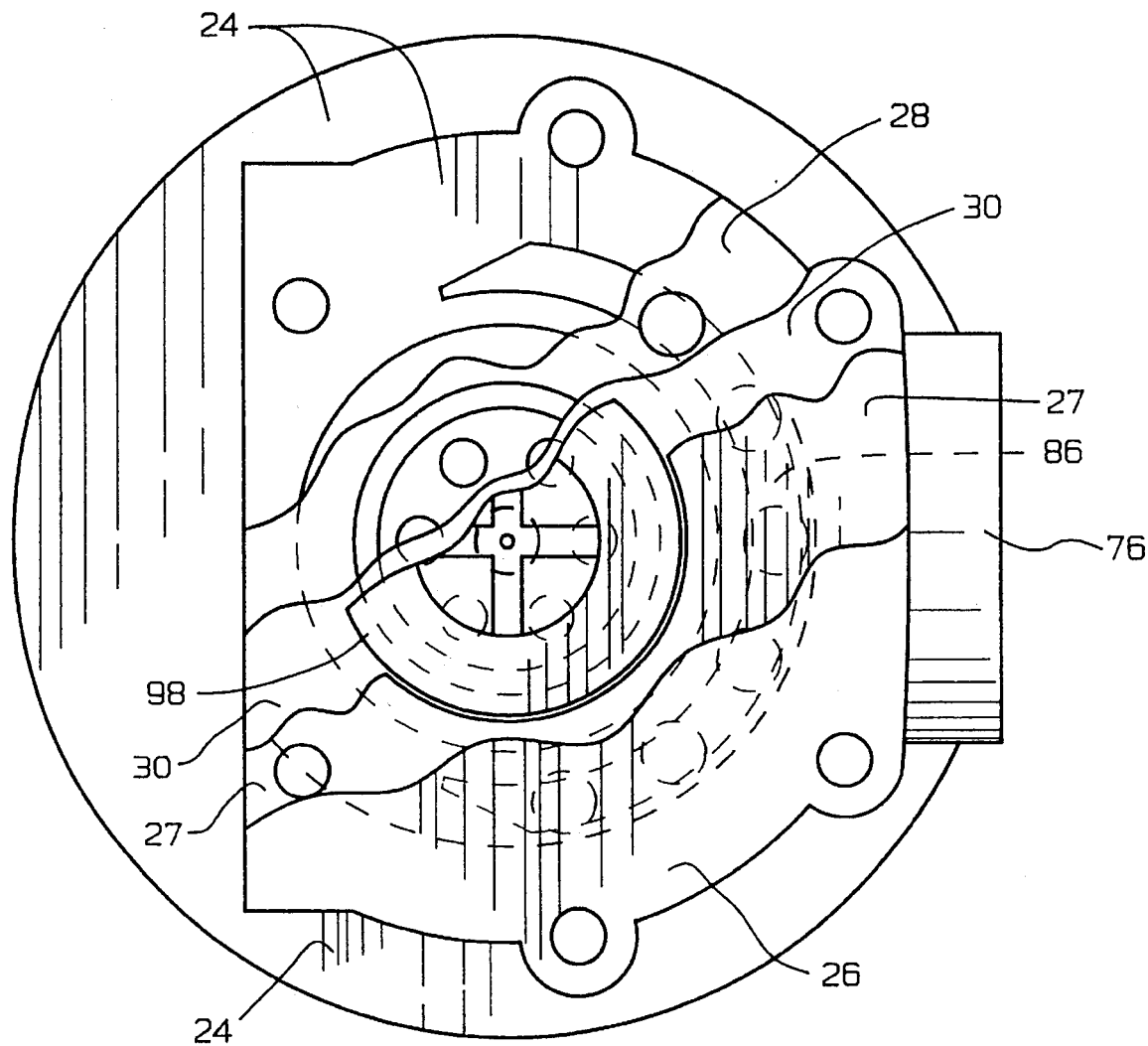
FIG. 9 is a layered, fragmentary top view of the valve head assembly shown in FIG. 6.

Each treatment tank assembly 12, 14 includes a valve head assembly 20 mounted on top and disposed in fluid communication with an interior of a treatment tank 22. Valve head assembly 20 (FIGS. 6 and 9) includes a body 24 and cap 26 separated by a disk 28. Cap 26 includes a spacer 27. A flexible membrane 30, such as an elastomeric membrane, overlies disk 28 and is disposed between cap 26 and disk 28. Body 24 includes a flange 32 disposed near a bottom end thereof and engages a treatment tank 22, such as shown in FIGS. 1–5. Body 24 also includes a plurality of passages for allowing a flow of fluid through valve head assembly 20. To wit, body 24 includes a first passage 32 in which is disposed a plunger valve 34. A compression spring 38 biases plunger valve 34 in a downward, closed position, whereby plunger valve 34 is in contact with shoulder 40.

Body 24 also includes a second passage 42 in which is disposed a poppet-type plunger valve 44. Disposed at a bottom end of valve 44 are first and second annular sealing rings 46, 48, which abut shoulders 50, 52, respectively. Disposed at an upper end of valve 44 is a flexible seal 54 which allows a flow of fluid therepast in an upward direction, but prevents a flow of fluid therepast in a downward direction.

Valve 44 includes a longitudinally extending opening 56 in which is disposed an insert 58 defining a venturi section 70. Each of valve 44 and insert 58 have radially extending openings 62 which allow a flow of fluid into venturi section 60. Plunger valve 44 also includes a plurality of radial openings 94 and a longitudinal opening 96 allowing a flow of fluid therethrough and into venturi section 60. Disposed between valve 44 and second passage 42 is a chamber 64.

Disposed above second passage 42 is a third passage 66, in which is inserted a cylindrical sleeve 68. A plurality of O-ring seals 70 provide a seal between third passage 66 and sleeve 68.

Body 24 also includes an inlet passage 72, outlet passage 74 and drain passage 76, each of which are respectively, fluidly connected to chamber 64, chamber 78 and chamber 80 via radial passages 82, 84 and 86.

Additional openings within body 24 include longitudinally extending openings 88, 90 providing communication between chamber 64 and the interior of treatment tank 22; and a passage 92 providing communication between chamber 80 and a valve described hereinafter. A fourth passage 69 defines a chamber 71 which is disposed below plunger valve 34. A radially extending opening 120 is in communication with the exterior of body 24 and chamber 71. A radially extending opening 122 is in communication with the exterior of body 24 and chamber 78.

Disposed between plunger valve 44 and disk 28 is a compression spring 93 which biases plunger valve 44 toward a first, closed position. Flexible membrane 30, disposed on top of disk 28, includes a disk 98 with a central opening 100 therein. Disposed within opening 100 is a screened filter 99. Flexible membrane 30, disk 98 and cap 26 define a chamber 102 therebetween. Chamber 102 is also disposed in fluid communication with a passage 104 formed in cap 26.

Extending between longitudinally extending opening 88 and chamber 102 is a counter-balance tube 105, which is connected to each of body 24 and cap 26. In an in-service mode of operation, water flows through counter-balance tube 105 into chamber 102 and provides a working, static pressure to chamber 102, thereby moving flexible membrane 30 and disk 98 to the closed position shown in FIG. 6. Moreover, during a regeneration mode of operation, water is pulled from the lower end of counter-balance tube 105 via the venturi action within plunger 44, which in turn evacuates a small amount of water from chamber 102 and allows flexible membrane 30 and disk 98 to move upward. In a rinse or pulsating mode of operation, water does not flow through counter-balance tube 105. Finally, during a refill mode of operation, water from the freshly charged tank flows through counter-balance tube 105, thereby moving flexible membrane 30 and disk 98 to the closed position shown in FIG. 6.

FIGS. 1–5 illustrate treatment tank assemblies 12, 14 interconnected by manifold 16 and electronic logic control board 18, whereby one or both of treatment tank assemblies 12, 14 may be placed in an in-service mode or one regeneration mode. Logic control board 18 is shown connected to a user interface device or numeric keypad 106 allowing a user to manually control logic control board 18, and in turn control treatment tank assemblies 12, 14. Logic control board 18 is also connected to a first solenoid valve 108 via line 110, a second solenoid valve 112 via line 114 and a third solenoid valve 116 via line 118. Each of treatment tank assemblies 12, 14 are constructed substantially the same in the embodiment shown, and thus have like reference numbers. For purposes of clarity, however, not all of the reference numbers have been indicated on treatment tank assembly 12.

Figure 6:
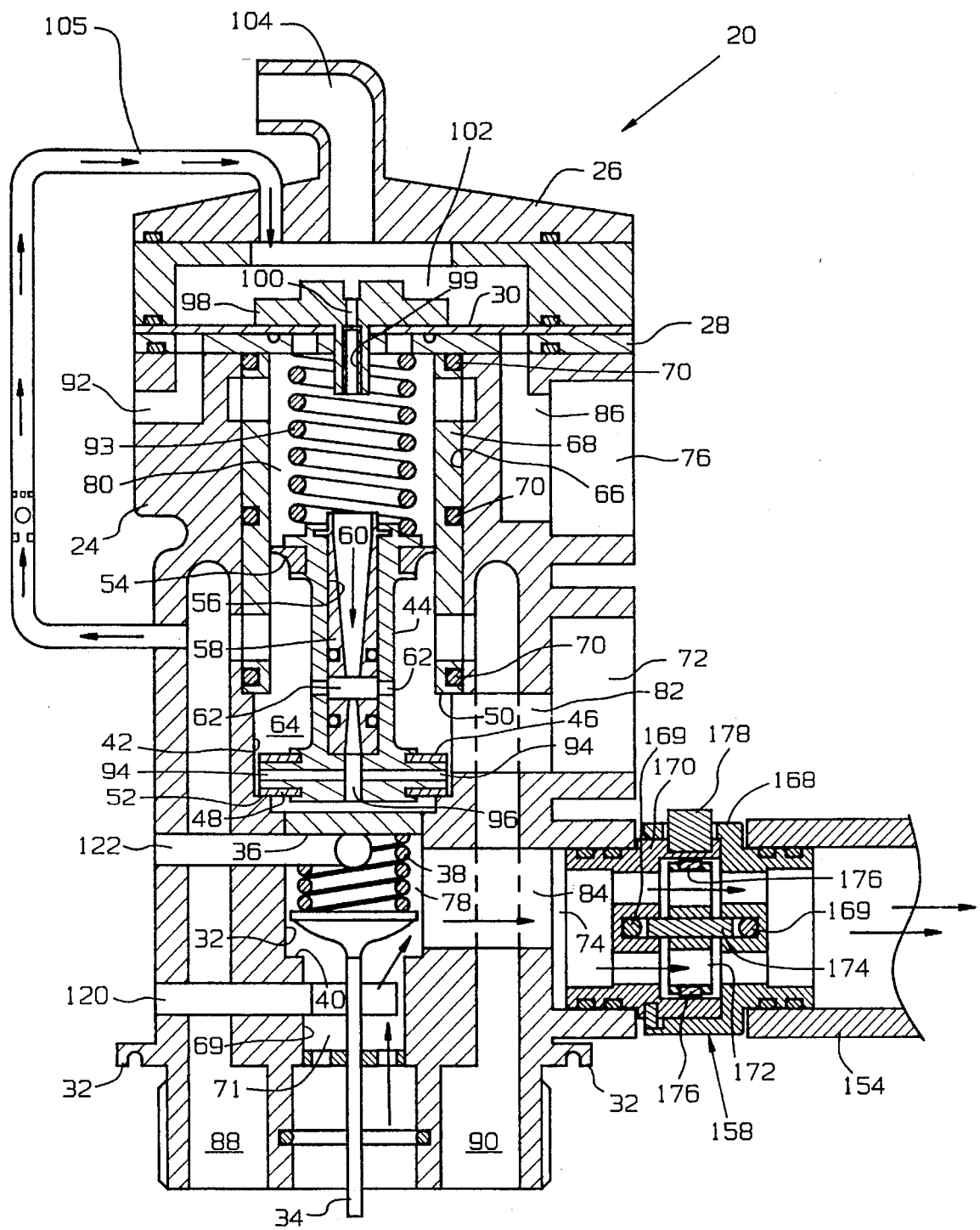
FIG. 6 is an enlarged view of the valve head assembly shown in FIGS. 1–5.

First valve 108 has an inlet line 124 disposed in communication with passage 92 of body 24 (FIG. 6). First valve 108 also includes an outlet line 126 disposed in communication with each of passage 104 and chamber 102 within cap 26, and regenerant induction line 128 via outlet line 130. Disposed within induction line 128 is a ball valve 132 allowing a flow of fluid in a downward direction, and disposed within outlet line 130 is a spring loaded check valve 134 allowing a flow of pressurized fluid in an upward direction.

Second valve 112 includes an inlet line 136 which is connected to radially extending opening 122 and chamber 71 (FIG. 6) and an outlet line 138 connected to an inlet line 140 of third valve 116. A ball valve 141 disposed between inlet line 140 and induction line 128 allows a flow of fluid in an upward direction.

A brine tank 142 is connected to regenerant induction line 128 and has a regenerant 144 disposed therein, such as sodium chloride. A float valve assembly 146 controls a level of liquid within brine tank 142, as is known.

Manifold 16 generally includes three T-pipes coupled together for convenience purposes. A first pipe 148 includes outlets 150 which are connected to respective inlet passages 72 (FIG. 6), and an inlet 152 which receives pressurized liquid from an external source (not shown), such as a water pump. Second pipe 154 includes inlets 156 which are connected to respective flow meters 158, which in turn are connected to outlet passage 74 (FIG. 6). Second pipe 154 also includes an outlet 160 connected to a line for supplying treated water to a faucet or the like. Third pipe 162 includes inlets 164 connected to drain passage 76 (FIG. 6) and an outlet 166 connected to a drain pipe.

Flow meters 158 (shown in greater detail in FIG. 6) include first housing part 168 sealingly coupled to a second housing part 170. A wheel 172 having a plurality of vanes is carried by a shaft 174 which in turn is rotatably supported by first and second housing part 168, 170. The interconnection between shaft 174 and first and second housing parts 168, 170 may include bearings. Moreover, the configuration of the vanes within wheel 172 is such that wheel 172 rotates upon a flow in either direction within flow meter 158. Wheel 172 includes at least one magnet 176 disposed therein which rotates past a sensor 178 upon rotation of wheel 172. Sensor 178 is connected via line 180 (FIG. 1) to logic control board 18.

Referring now to FIGS. 1–5, operation of the present invention will be described. For each of the modes of operation described above, logic control board 18 controls the length of time in which first valve 108, second valve 112 and third valve 116 are in an open or closed position.

FIG. 1 discloses a mode of operation wherein each of treatment tank assemblies 12, 14 are in an in-service mode. Poppet-type plunger valve 44 is in the downward, closed position; and plunger valve 34 is in the upward, open position. Water flows through first pipe 148 and into chamber 64 of valve head assembly 20. The water then flows downward through longitudinal openings 88, 90, through filter 181, and into treatment tank 22. The water flows in a downward direction through resin bed 182, whereby impurities such as calcium and magnesium are removed from the water via ion exchange. The water then flows through a filter 184 and into vertical pipe 186. The pressurized water moves plunger valve 34 to the upright, open position and flows therepast to outlet 160 of second pipe 154.

Figure 2:
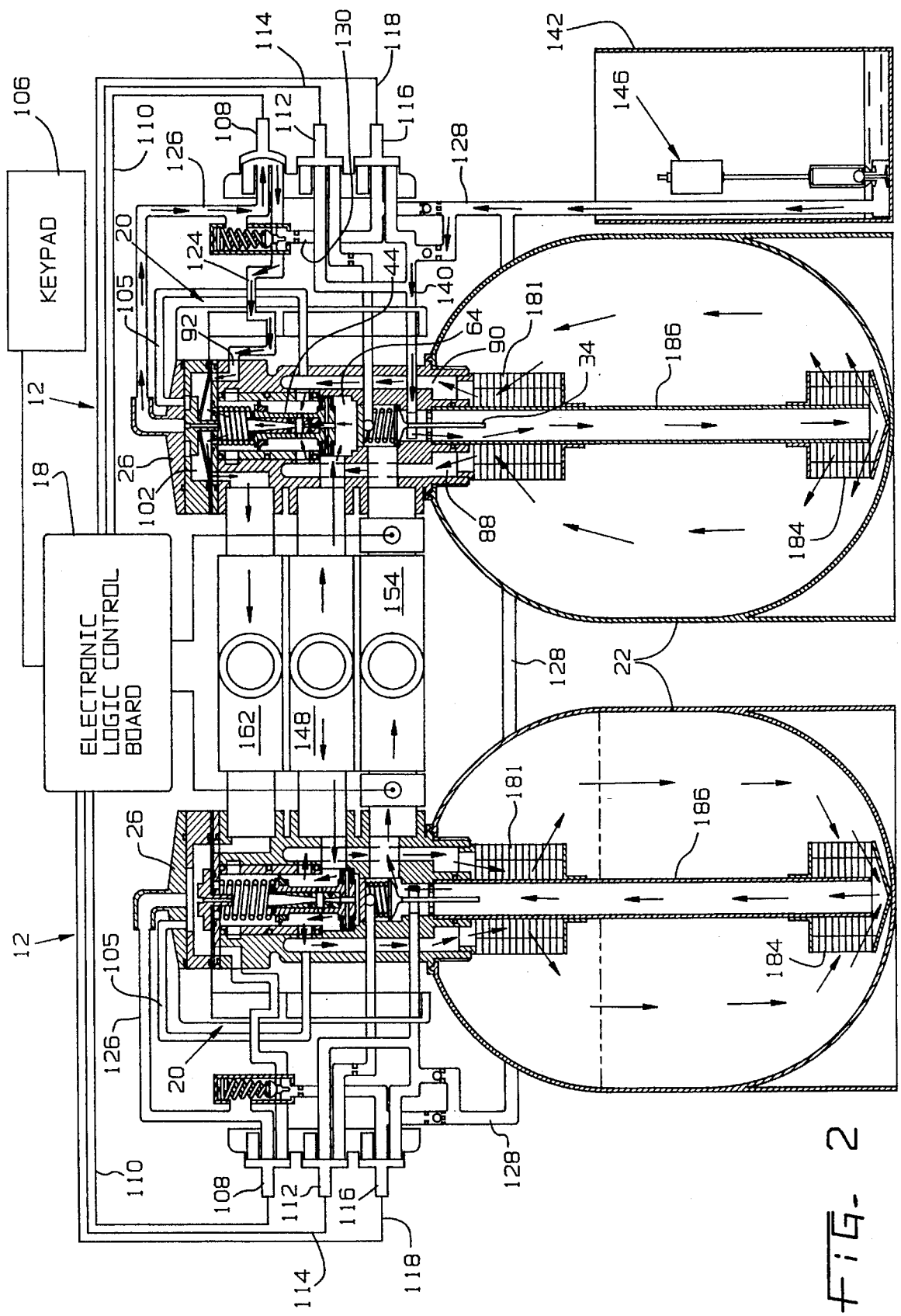
FIG. 2 is a schematic illustration of the embodiment of FIG. 1, showing fluid flow during a brine draw mode.

FIG. 2 illustrates treatment tank assembly 12 in an in-service mode and treatment tank assembly 14 in a brine draw mode of operation. Fluid flow through treatment tank assembly 12 is as described above with regard to FIG. 1. With regard to treatment tank assembly 14, first valve 108 is in an open position and second and third valves 112 and 116 are in a closed position. When third valve 116 is closed, pressurized fluid is no longer supplied within cap 26. When first valve 108 is opened, water flows past seal 54 of plunger valve 44 and causes plunger valve 44 to move to the upward, open position, as shown. The pressurized water within chamber 80 causes flexible membrane 30 to move to the upper position shown, whereby water may flow through inlet line 124 to first valve 108. The water then flows through outlet line 126 and into chamber 102. The small diameter central opening 100 (FIG. 6) allows a correspondingly small amount of fluid to flow therethrough. The amount of water thus flowing through first valve 108 is regulated by varying the diameter of central screened opening 100. In contrast, passage 92 has a relatively large diameter. Therefore, substantially all the water flowing into chamber 80 flows out through passage 92, and a lesser amount of the fluid flowing through chamber 80 flows through first valve 108.

When plunger valve 44 is in the upward position whereby annular sealing ring 46 engages shoulder 50, water flows through radial openings 94 and longitudinal opening 96 into venturi section 60. Venturi section 60 creates a low pressure within chamber 64, which in turn induces a flow of water through longitudinal openings 88, 90 and first pipe 148. The flow of water into chamber 64 in turn induces a flow of brine from brine tank 142 through induction line 128, radially extending opening 120, filter 181, vertical pipe 186 and filter 184. As in apparent from FIG. 2, a counter-current regeneration is effected, wherein the flow of water through treatment assembly 14 during an in-service mode is opposite to the flow of water through treatment tank assembly 14 during a brine draw mode.

Figure 3:
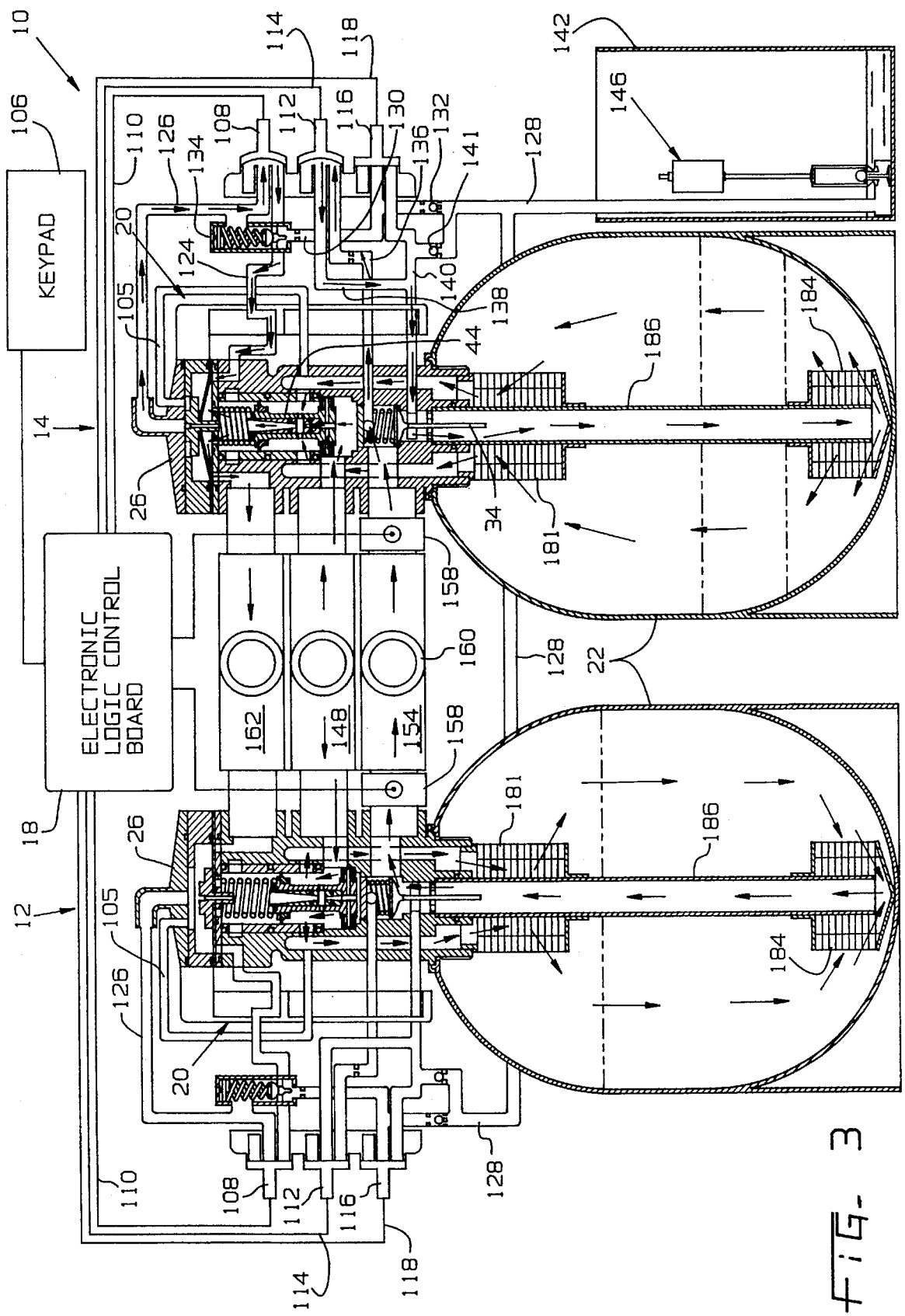
FIG. 3 is a schematic illustration of the embodiment of FIG. 1, showing fluid flow during a pulsating rinse mode.

FIG. 3 illustrates a mode of operation wherein treatment tank assembly 12 is in an in-service mode and treatment tank assembly 14 is in a pulsating rinse mode. It will be noted that plunger valve 44 is an upper position for inducing a flow of liquid as described above with regard to FIG. 2. However, rather than receiving a supply of water from brine tank 142 via induction line 128, second valve 112 is moved to an open position whereby pressurized and treated water from treatment tank assembly 12 flows through inlet line 136 and into treatment tank 22 in a counter current direction. The pressurized water within inlet line 140 also moves ball valve 141 to a closed position as shown, wherein fluid does not flow into brine tank 142.

During the pulsating rinse mode, logic control board 18 controls first valve 108 whereby at least two regeneration options may be effected. To wit, keypad 108 may be utilized to select either a full pulse regeneration, a half pulse regeneration, no pulse regeneration and filter regeneration. During full pulse regeneration, 100% of the pulse rinse is activated, which means valve 108 is on all the time. Valve 112 is on one second and off three seconds, during full pulse regeneration. During no pulse regeneration, only a maximum of 12% of the pulse program is activated (to prevent channeling of the resin bed), which means valve 108 and 112 are on the majority of the time. During half pulse regeneration, 50% of the full pulse program is activated, using the same valve as stated above. With the balance of the cycle valve 112 stays on. During filter regeneration, brine cycle and refill cycle is significantly reduced to create a vacuum in the tank at about 10% of the cycle time based on capacity. The refill cycle is reduced accordingly. An extended full pulse regeneration is initiated during the filter regeneration. These regeneration options are on time or demand mode.

It will be appreciated from FIG. 3 that treated water is utilized from treatment tank assembly 12 to rinse the resin bed within treatment tank assembly 14. The embodiment as shown not only monitors treated water which flows out through outlet 160, but also monitors the flow of water used to rinse the resin bed in a parallel treatment tank assembly. That is, at least one flow meter 158 provides input pulses to logic control board 18, which in turn reduces the preset amount stored in memory corresponding to the volume of water transported from the treatment tank assembly during an in-service mode prior to regeneration thereof. Logic control board 18 receives input pulses from at least one flow meter 158 representing a volume of water flowing therepast. Each of treatment tank assemblies 12, 14 has a capacity at which the treatment tank assembly must be regenerated. For example, each treatment tank assembly shown in FIGS. 1–5 has a capacity of exchanging 5,000 grains of hardness. For a particular application, the untreated water received via first pipe 148 has a hardness which falls within a known range per gallon, e.g., 6–10 parts per million. It is thus possible to calculate how many gallons of water may be transported through second pipe 154 prior to regeneration of the corresponding treatment tank assembly. Rather than using two flow meters 158 as shown in FIGS. 1–5, it may also be possible to use a single flow meter attached to outlet 160 of second pipe 154.

Figure 4:
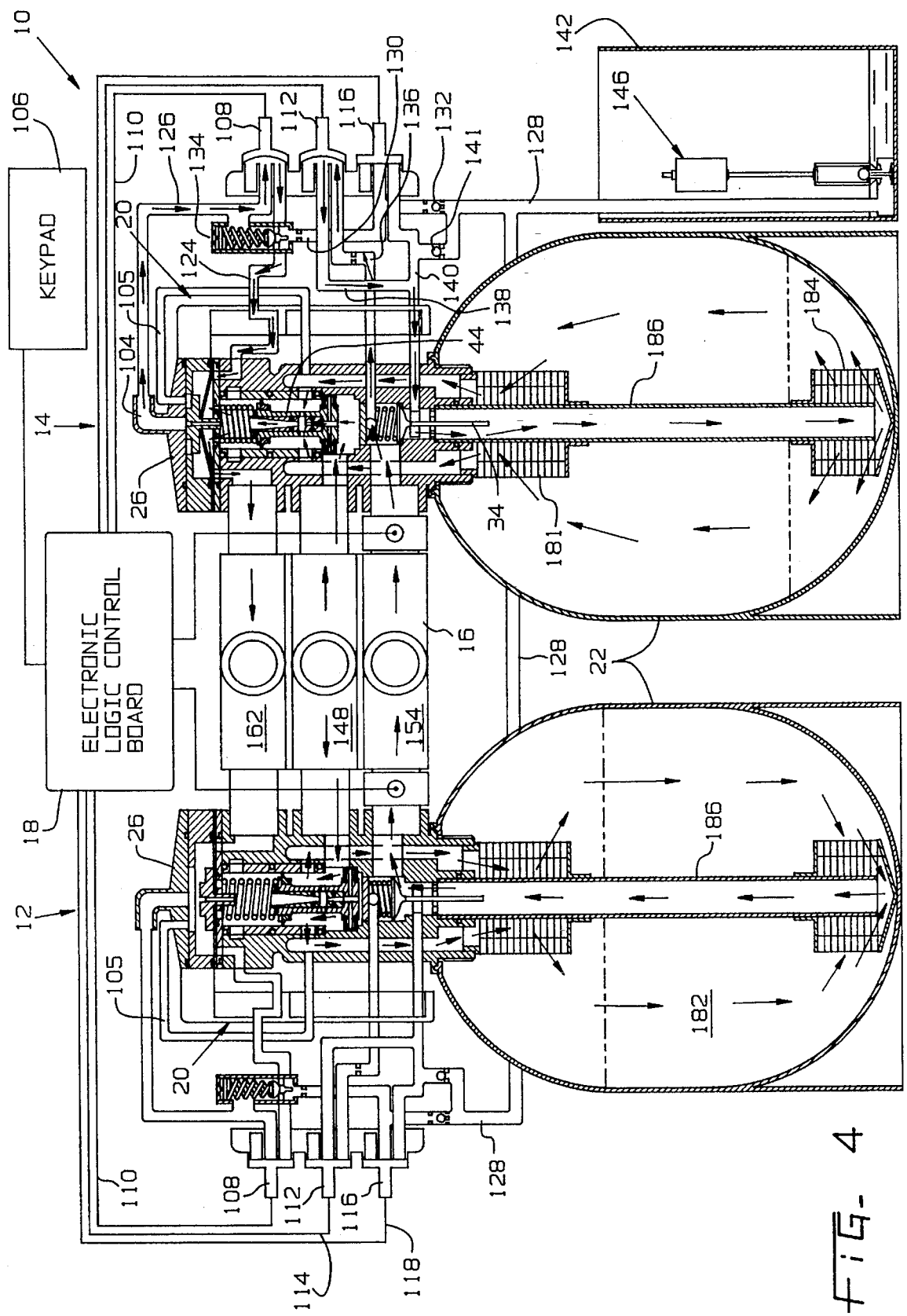
FIG. 4 is a schematic illustration of the embodiment of FIG. 1, showing fluid flow during a purge mode.

FIG. 4 illustrates another mode of operation wherein treatment tank assembly 12 is in an in-service mode and treatment tank assembly 14 is in a purge or fast rinse mode. The flow paths within treatment tank assembly 14 are the same as described above with regard to the pulsating rinse mode shown in FIG. 3. However, rather than opening and closing first valve 108 to provide a pulsating rinse, first valve 108 is instead maintained in an open position whereby treated water from treatment tank assembly 12 continuously flows through treatment tank 22 in a counter current direction.

Figure 5:
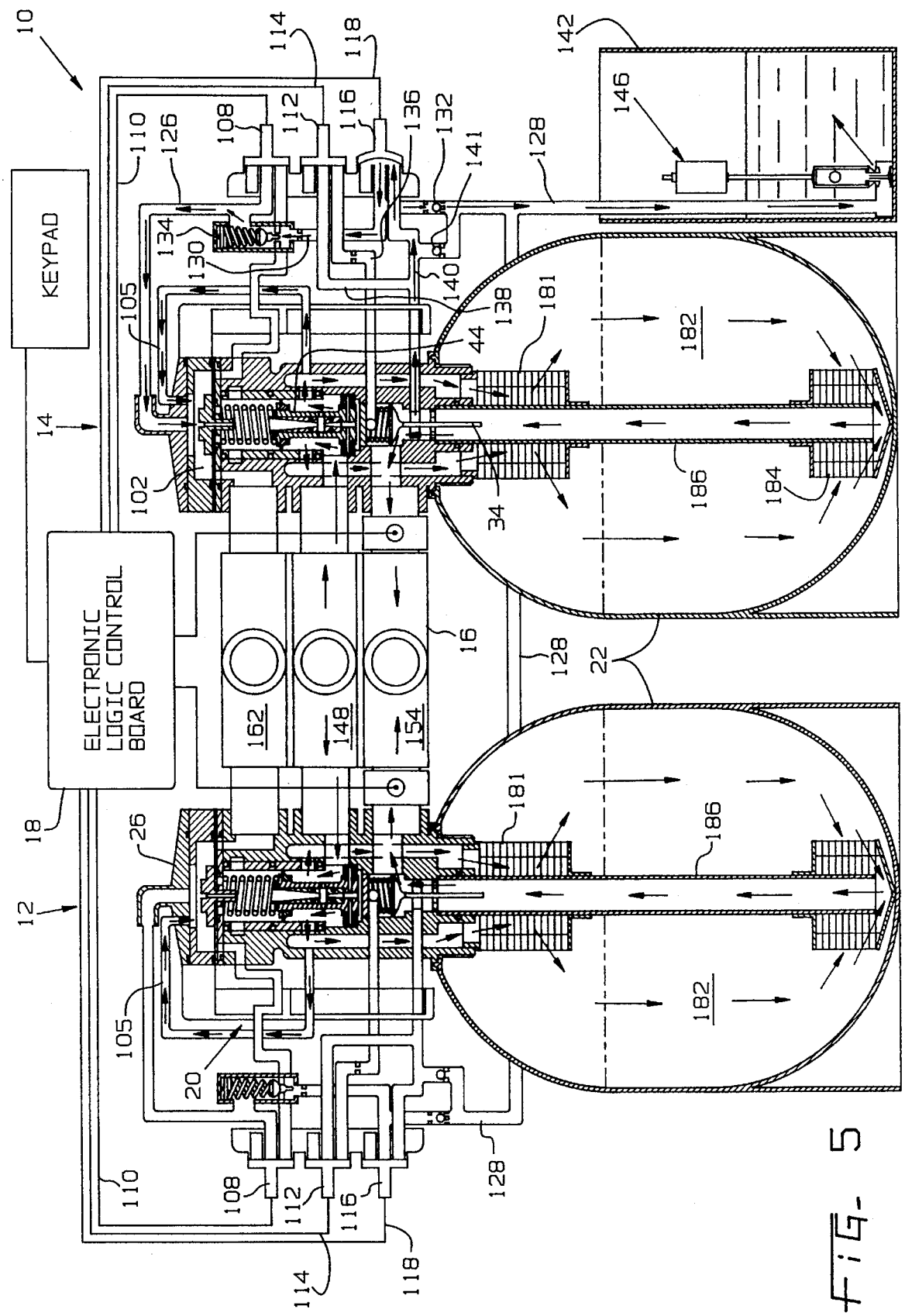
FIG. 5 is a schematic illustration of the embodiment of FIG. 1, showing fluid flow during a brine tank refill mode.

FIG. 5 illustrates another mode of operation of the present invention wherein treatment tank assembly 12 is in an in-service mode, and treatment tank assembly 14 is in a brine tank refill mode. As is apparent, treated water is available to second pipe 154 from treatment tank assembly 14. In addition, first valve 108 and second valve 112 are in a closed position and third valve 116 is in an open position allowing treated water to flow both in an upward direction through outlet line 130 and a downward direction into brine tank 142 through induction line 128. The treated water flowing through outlet line 130 then flows through check valve 134, outlet line 126 and into chamber 102 for moving flexible membrane against disk 28 and closing passage 92 and drain passage 76. The treated water flowing in a downward direction through induction line 128 fills brine tank 142 to a predetermined level, as controlled by float valve assembly 146.

Figure 7:
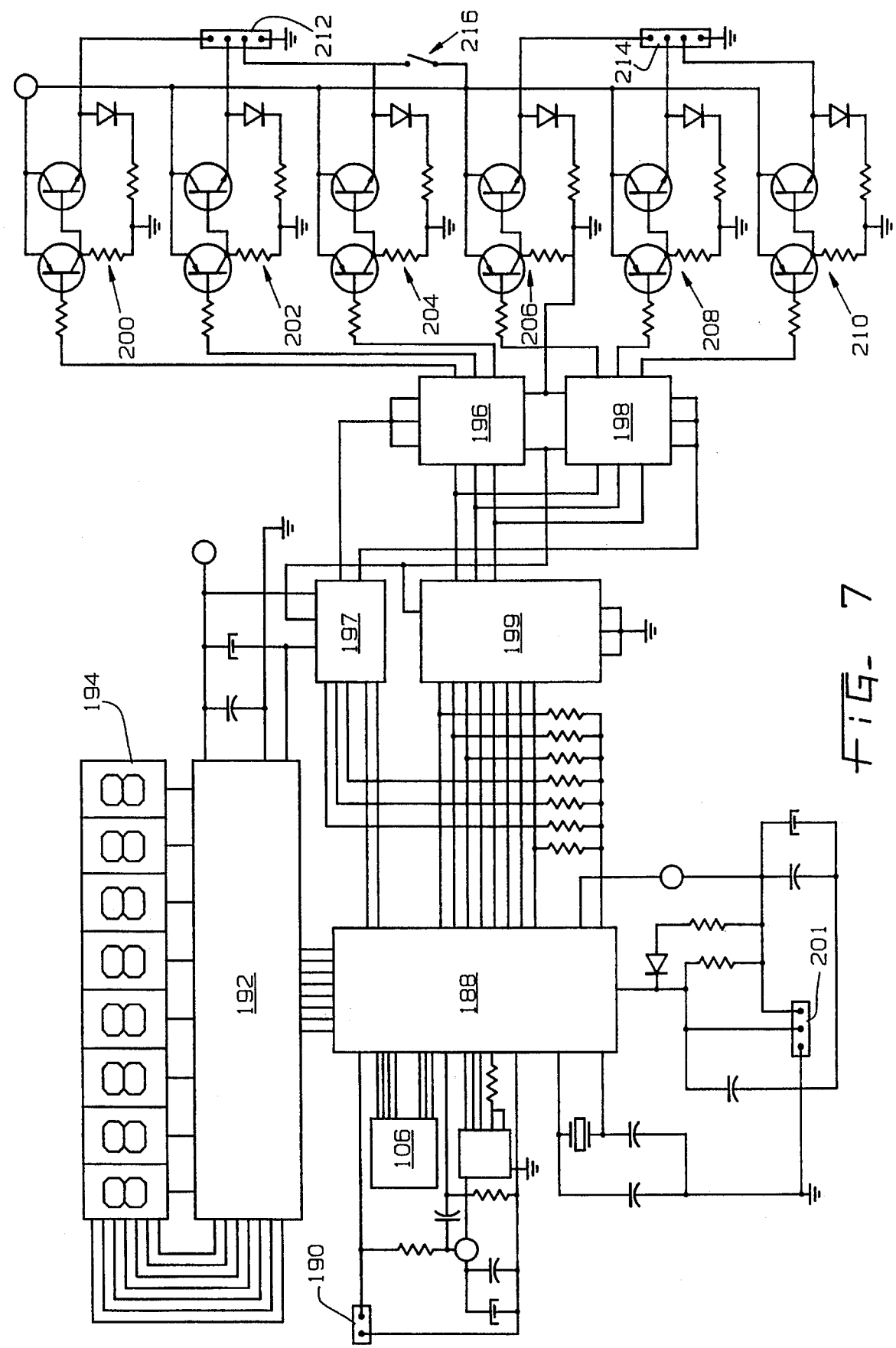
FIG. 7 is an electrical schematic of an embodiment of the processor of the present invention.

FIG. 7 is a schematic illustration of the circuitry of logic control board 18 shown in FIGS. 1–5. Various components include microcontroller 188, key pad 106, key pad lock 190, amplifier/driver 192, display device 194 (such as an LED display), AND gates 196, 198, control gates 200, 202, 204, 206, 208 and 210, treatment tank solenoid valve control ports 212, 214, manual refill switch 216, latched line decoders 197, 199, and flow meter sensor ports 201. Microcontroller 188 receives input data from flow meter sensor ports 201, and provides output signals used for controlling solenoid valve control ports 212, 214. Control gates 200, 202, 204, 206, 208 and 210 are interposed between microcontroller 188 and solenoid valve control ports 212, 214, and respectively control the opening and closing of solenoid valves 108, 112 and 116. Display device 194 can be used to selectively display a total flow amount through a particular tank since a last regeneration, a total flow amount through the system since a predetermined point in time, an indication of which tank(s) are in an in-service mode or regeneration mode, an overlap amount for a particular tank, a preset amount for a particular tank, and other indicia of system performance and operation.

In the embodiment of the circuitry shown in FIG. 7, alternating current power is used to drive solenoid valves 108, 112 and 116. Conventional designs use direct current power to drive solenoid valves, which results in overheating and failure of the solenoid valves. The present invention therefore overcomes a problem of conventional designs by utilizing alternating current power.

Figure 8:
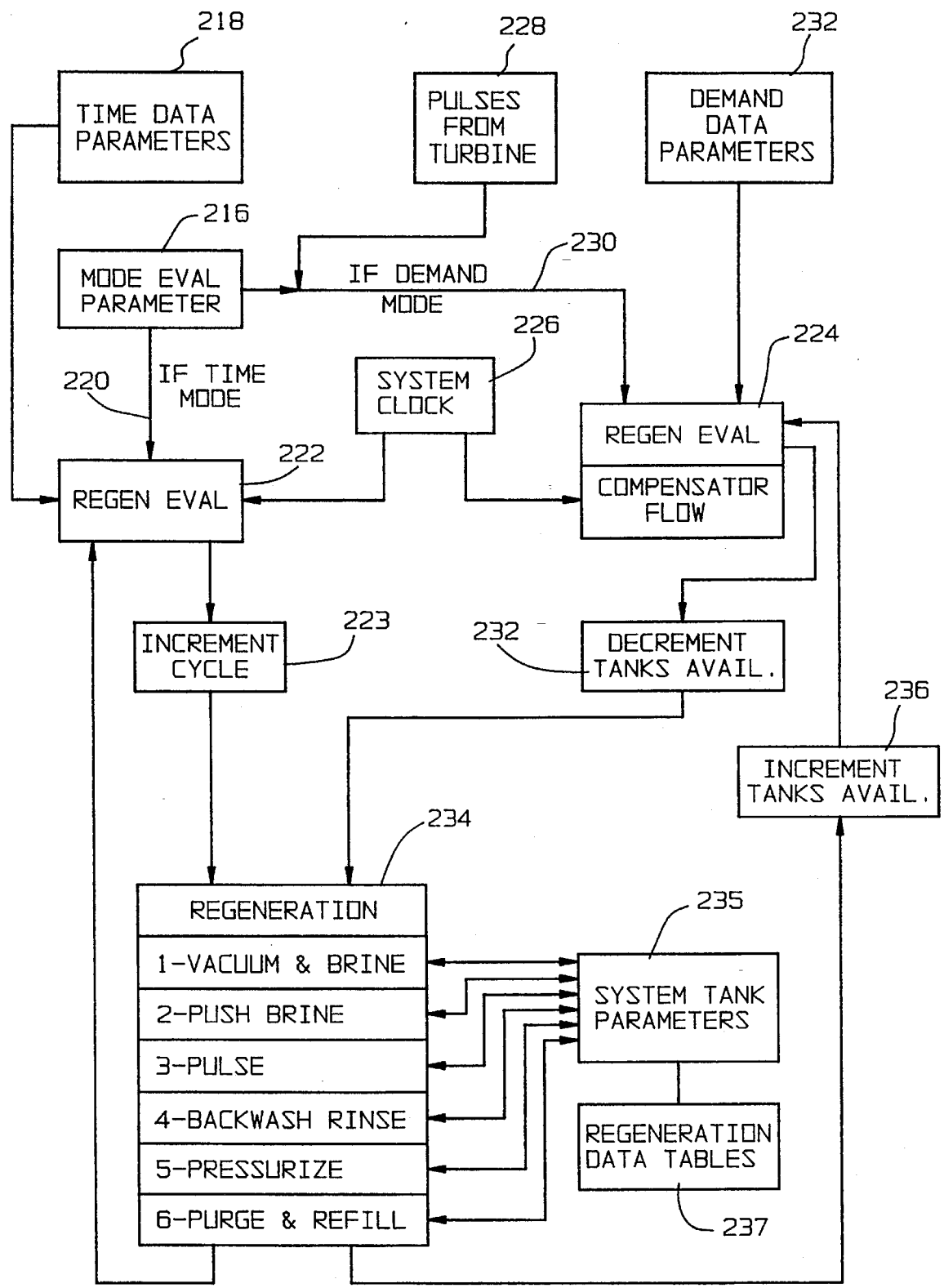
FIG. 8 is a flow chart of the decisional steps carried out by an embodiment of a processor of the present invention.

FIG. 8 illustrates a flow chart of the logic carried out by control board 18. Block 216 represents a selective mode evaluation parameter corresponding to either a time mode of operation or a demand mode of operation. For a time mode of operation, a particular treatment tank assembly is regenerated after a particular period of time. For a demand mode of operation, a particular treatment tank assembly is regenerated after a particular volumetric amount of liquid has been transported from a treatment tank assembly. If a time mode of operation is selected (line 220), a regeneration evaluation block 222 is utilized. In contrast, if a demand mode of operation is elected, a regeneration evaluation block 224 is used. Other data inputs to regeneration evaluation block 222 include time data parameter from block 218 representing a particular amount of time at which a treatment tank assembly is regenerated; and a time value of a system clock from block 226. Data inputs to regeneration evaluation block 224 include sensed pulses from a turbine or flow meter (block 228) via line 230; demand data parameter from block 232 representing a particular volume at which the treatment tank assembly is to be regenerated; and a time value from a system clock in block 226.

When regeneration evaluation block 224 determines that a preset amount of water has been transported from a particular treatment tank assembly, the particular treatment tank assembly to be regenerated is removed from memory as a tank available for an in-service mode (block 232) and regeneration of the particular treatment tank assembly occurs in block 234. After regeneration of the particular treatment tank assembly is completed, the treatment tank assembly is placed back in memory as being available for an in-service mode of operation in block 236. The "system tank parameters" (block 235) corresponds to physical data associated with a particular tank used, e.g., such as tank capacity and grains. Such data can be in the form of electronic data stored in a memory. Regeneration data tables (block 237) correspond to data indicating when a particular tank should be regenerated or timed modes within the regeneration, e.g., hardness of water, rinse modes, half pulse mode, etc.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A water treatment system, comprising:
   a treatment tank having an ion-exchange mineral bed therein;
   a valve head assembly disposed on top of and in fluid communication with said treatment tank, said valve head assembly including a passage means for allowing a flow of fluid through said valve head assembly, means disposed within said passage means for creating a vacuum pressure within said treatment tank, a drain disposed within said passage means and at a downstream side of said vacuum pressure creating means, a valve disposed within said passage means and at a downstream side of said vacuum pressure creating means, said valve movable to an open position and a closed position for allowing fluid flow through said vacuum pressure creating means, and means for directing a portion of the fluid flowing through said vacuum pressure creating means to said drain and directing a lesser remaining portion of the fluid flowing through said vacuum pressure creating means to said valve when said valve is in said open position.

2. The water treatment system of claim 1, wherein said valve comprises a solenoid valve.

3. The water treatment system of claim 2, wherein said solenoid valve and said drain are disposed in parallel to each other at said downstream side of said vacuum pressure creating means.

4. The water treatment system of claim 1, wherein said passage means includes an inlet and an outlet, and wherein said vacuum pressure creating means comprises a poppet-type plunger valve having a venturi section, said plunger valve movable to a first position when said valve is in said closed position and a second position when said valve is in said open position.

5. The water treatment system of claim 1, further comprising a brine tank connected to an interior of said valve head assembly.

6. A water treatment system, comprising:
   a plurality of treatment tanks, each said treatment tank having one of an ion-exchange mineral bed and filter bed therein and an outlet;
   a plurality of valve head assemblies respectively disposed on top of and in fluid communication with each said treatment tank, each said valve head assembly including passage means for allowing a flow of fluid through said valve head assembly, means disposed within said passage means for creating a vacuum pressure within said treatment tank, a drain disposed within said passage means and at a downstream side of said vacuum pressure creating means, and a solenoid valve disposed within said passage means and in parallel to said drain at a downstream side of said vacuum pressure creating means, said solenoid valve movable to an open position and a closed position for allowing fluid flow through said vacuum pressure creating means; and
   at least one sensor associated with at least one of said treatment tank outlets and providing an output signal representing an amount of fluid flowing through said at least one treatment tank outlet; and
   a processor receiving said output signal and controlling said valve dependent on said output signal.

7. The water treatment system of claim 6, further comprising a brine tank connected to an interior of at least one said valve head assembly, said vacuum pressure creating means for inducing a flow of brine from said brine tank through said treatment tank.

8. The water treatment system of claim 6, wherein said drain constitutes a means for preventing debris from flowing through said solenoid valve.

9. The water treatment system of claim 6, wherein said processor includes means for determining at least one of:
   an amount of water flowing through all of said treatment tanks;
   an amount of water flowing through each said treatment tank during an in-service mode of each respective said treatment tank;
   an amount of lost water per unit of time which is lost by said system;
   an amount of water used by one of said treatment tanks during an in-service mode to regenerate another said tank;
   a preset amount representing a volume of water through one of said treatment tanks at which said one tank is regenerated; and
   a reduction in said preset amount for a particular treatment tank by an overlap amount representing an amount of water which has flowed through said particular treatment tank since a last regeneration for said particular treatment tank minus said preset amount.

10. A water treatment system, comprising:
   a plurality of treatment tanks, each said treatment tank having one of an ion-exchange mineral bed and filter bed therein and an outlet;
   a plurality of valve head assemblies respectively disposed on top of and in fluid communication with each said treatment tank, each said valve head assembly including passage means for allowing a flow of fluid through said valve head assembly, means disposed within said passage means for creating a vacuum pressure within said treatment tank, a drain disposed within said passage means at a downstream side of said vacuum pressure creating means, and a solenoid valve disposed within said passage means and in parallel to said drain at a downstream side of said vacuum pressure creating means, said solenoid valve movable to an open position and a closed position for allowing fluid flow through said vacuum pressure creating means; and a processor for controlling said solenoid valve to effect one of at least two regeneration options selected from the group consisting of a full pulse regeneration, a half pulse regeneration, no pulsed regeneration and filter regeneration.

11. The water treatment system of claim 10, wherein each said valve head assembly includes a plurality of further solenoid valves, each said solenoid valve movable to an open position and a closed position for allowing fluid flow through said vacuum pressure creating means, and wherein said processor includes means for maintaining a selected one of said solenoid valves in said open position for a predetermined amount of time.

12. The water treatment system of claim 11, further comprising an interface device connected to said processor, said processor including means for changing said predetermined amount of time dependent on data input from said interface device.

13. The water treatment system of claim 11, wherein said interface device comprises a numeric keypad.

* * * * *